United States Patent [19]

Yoneda et al.

[11] Patent Number: 4,839,762
[45] Date of Patent: Jun. 13, 1989

[54] ROTARY HEAD DEVICE

[75] Inventors: Kou Yoneda, Tokyo; Hideaki Miyakawa; Shinichi Hara, both of Kanagawa, all of Japan

[73] Assignee: Canon Kabushiki Kaisha, Tokyo, Japan

[21] Appl. No.: 62,793

[22] Filed: Jun. 16, 1987

[30] Foreign Application Priority Data

Jun. 25, 1986 [JP] Japan ................................ 61-147078
Jun. 25, 1986 [JP] Japan ................................ 61-147079

[51] Int. Cl.$^4$ ...................... G11B 21/04; G11B 15/60
[52] U.S. Cl. ................................. 360/107; 360/130.24
[58] Field of Search ...................... 360/107, 130.24, 84, 360/85

[56] References Cited

U.S. PATENT DOCUMENTS 4,184,183  1/1980  Dolby ................................... 360/107
4,306,262 12/1981  Takano ........................... 360/130.24
4,669,022  5/1987  Van Rooij ...................... 360/130.24

Primary Examiner—A. J. Heinz
Attorney, Agent, or Firm—Robin, Blecker & Daley

[57] ABSTRACT

A rotary head device comprising a stationary cylinder having a step portion on its peripheral surface to guide a tape-shaped medium and a rotary cylinder arranged to rotate freely relative to the stationary cylinder and having a corresponding diameter to that of the above-described stationary cylinder, the rotary cylinder being formed with an integral peripheral surface portion on the nearer side to the stationary cylinder of a rotary head mounted so as to project outwardly of a peripheral surface of the rotary cylinder.

8 Claims, 5 Drawing Sheets

ROTARY HEAD DEVICE

BACKGROUND OF THE INVENTION

1. Field of the Invention

This invention relates to rotary head devices, and more particularly to rotary head devices for guiding a tape-shaped medium to a peripheral surface to record or reproduce signals on or from the tape-shaped medium.

2. Description of the Related Art

FIG. 1 to FIG. 5 are figures for explaining about the conventional rotary head device.

In FIG. 1, a cylinder C is constructed with an upper drum 1 and a lower drum 2, between which exists a slit 3. A magnetic tape 4 (recording medium) is trained round the cylinder C. A magnetic head 5 is fixed to the upper drum 1 and its sliding surface 6 (to be described more fully later) with the magnetic tape 4 is made to protrude outwardly of the peripheral surface of the upper drum 1. Of the upper and lower drums 1 and 2 constituting the cylinder C, the lower drum 2 is the stationary drum, and the upper drum 1 is the rotary drum rotatably arranged relative to the lower drum 1. The magnetic head 5 is mounted to the upper drum 1 and rotates along therewith and the sliding surface 6 runs on the magnetic tape 4. FIG. 2 in exaggerated scale illustrates the magnetic head 5 and its neighborhood, and FIG. 3 illustrates the upper drum 1 as turned upside down to reveal how the magnetic head 5 is mounted. In these figures, 1–5 represent the same parts as those of FIG. 1. A recessed portion 7 is provided in that parallel plane of the upper drum 1 which faces at the slit 3 with its one side opened in the peripheral surface thereof. The magnetic head 5 is fixedly secured within this recessed portion 7. 8 represents a magnetic gap of the magnetic head 5.

Next, the operation is described.

At first, for comparison, explanation is given to a case where the drum has no recessed portion 7 and no magnetic head 5 by reference to FIG. 4. Now suppose the magnetic tape 4 is trained round the cylinder C and the upper drum 1 rotates at a peripheral velocity V. When the upper drum 1 stands still, the magnetic tape 4, while remaining to be trained round the upper drum 1, is in contact with it. But, upon rotation of the upper drum 1, because air has a viscosity, the air layer on the surface of the upper drum 1 is drawn along to move. As a result, an air flow takes place between the upper drum 1 and the magnetic tape 4 in the same direction as that of rotation of the upper drum 1, causing the magnetic tape 4 to float up from the upper drum 1. And, the upper drum 1 and the magnetic tape 4 move relative to each other in spaced relation by some distance. This distance Hd is given by the following expression $$Hd = 0.643 \cdot Rd \cdot (6\mu V/T)^{\frac{2}{3}} \quad (1)$$

where RD is the radius of the upper drum 1, $\mu$ is the coefficient of viscosity of air, V is the relative speed between the upper drum 1 and the magnetic tape 4, T is the tension applied to the magnetic tape in the longitudinal direction.

If the recessed portion 7 exists in the upper drum 1 as in the prior art, however, the uniformity of the air flow between the upper drum 1 and the magnetic tape 4 is broken. Therefore, as shown in FIG. 5, the distance the magnetic tape 4 floats becomes different between the front and rear sides of the recessed portion 7. That is, now assuming that the magnetic head 5 is not in use, it is then ahead of the recessed portion 7 as viewed to the direction of rotation of the upper drum 1 that the distance $Hd_1$ the magnetic tape 4 floats is equal to that Hd without the recessed portion 7, but behind it that the distance $Hd_2$ becomes narrower than that Hd by about one figure. In accompaniment with this, the force that lifts the magnetic tape 4 upward is decreased at or near the position of the recessed portion 7. So, in some case, it happens that the magnetic tape 4 is looped below the cylindrical surface of the upper drum 1 into the interior of the recessed portion 7.

Such an influence of the presence of the recessed portion 7 on the lift-up amount of the magnetic tape 4 is produced regardless of whether or not the magnetic head 5 is installed. Therefore, in the conventional device shown by FIGS. 1 to 3, the decrease of the lift-up amount of the magnetic tape 4 by the presence of the recessed portion 7 is reflected to an increase of the apparent protruding amount of the magnetic head 5. This results in that the magnetic head 5 and the magnetic tape 4 are brought into contact with each other under a large pressure. Hence, the worn amount of the magnetic head 5 becomes large. Also, the damage of the magnetic tape 4 due to the running of the magnetic head 5 increases and, in the worst case, streaks are formed. Also, when the magnetic tape 4 sinks into the recessed portion 7, particularly at the position behind the magnetic head 5, the magnetic tape 4 will be scratched by the rear edge of the opening of the recessed portion 7. Further, the increase of the apparent length of protrusion of the magnetic head 5 with the decrease of the lifting-up distance of the magnetic tape 4 also causes the quantity of jitter to increase. In more detail, the magnetic head 5 enters under the magnetic tape 4 with an increased frictional resistance therebetween, and, therefore, vibrates the magnetic tape 4 in the lateral direction. This causes the increase of the quantity of jitter.

The extent of the above-described decrease of the lifting-up distance of the magnetic tape 4 due to the presence of the recessed portion 7 increases with decrease of the thickness of the tape. In particular, recently, the thickness of the magnetic tape is as far decreased as possible in order to increase the total recording time of the cassette for VTR. Therefore, the problem arising from the decrease of the above-described lifting-up distance due to the presence of the recessed portion 7 has been serious.

In the prior art, however, because the lifting-up distance differs across the width of the magnetic tape 4, there has arisen the following problem. That is, FIG. 6 illustrates the variation with width of the lifting-up distance as the magnetic tape 4 lies over both upper and lower drums 1 and 2 in almost evenly distributed relation. As is understandable from the figure, it is on the lower drum 2 that the lifting-up force is not exerted because it remains stationary. Therefore, the lower half of the width of the magnetic tape 4 does not float but contact on the peripheral surface of the lower drum 2. Meanwhile, the upper drum 1 produces the lifting-up force thereon, but the tape floating amount is not uniform because the circumstantial condition differs. Particularly as approaching to the peripheral edge of the inside parallel plane of the upper drum 1 or the slit 3, the floating amount decreases. Despite this, the magnetic head 5 is made placed adjacent the slit 3. Moreover, it is usual that it may project about several tens of microns outwardly of the peripheral surface of the upper drum 1. Because of this, the pressure under which the magnetic tape 4 and the magnetic head 5 contact with each other in a portion at or near the slit 3 necessarily becomes high. As a result, the magnetic head 5 is one-sidedly worn out. Also, from the same reason, the damage of the magnetic tape 4 is intensified. Also, the friction between the magnetic head 5 and the magnetic tape 4 and between the upper drum 1 and the magnetic tape 4 gives streaks to the magnetic tape 4 with a high possibility. The conventional rotary head device owing to such causes has been poor in durability and fidelity.

Also, the magnetic tape 4 makes an angle with the flat plane of the cylinder C when it is trained round. Therefore, that fraction of the width of the magnetic tape 4 which is on the upper drum 1 varies from the full width to zero depending on the angular position of the drum 1. And, because the floating amount of the magnetic tape 4 depends on the superimposed width of the magnetic tape 4 on the rotating upper drum 1, it takes a large value at the start (termination) of training, and a small value at the termination (start) of training. As a result, the spacing between the magnetic head 5 and the magnetic tape 4 is influenced to constantly change by the floating amount of the entirety of the magnetic tape 4, causing the envelope of the reproduced output signals to become uneven.

SUMMARY OF THE INVENTION

An object of the present invention is to eliminate the above-described problems.

Another object is to provide a rotary head device which enables the worn amount of the rotary head to be suppressed to a minimum.

Still another object is to provide a rotary head device which enables the damage of a tape-shaped medium to be suppressed to a minimum.

A further object is to provide a rotary head device which can assure good recording or reproduction of signals by the head.

Under such objects, according to the present invention, as one embodiment thereof, a rotary head device is proposed, comprising a stationary cylinder having a stepped portion on the peripheral surface thereof to guide the tape-shaped medium, a rotary cylinder rotatably supported relative to the stationary cylinder and having an outer periphery whose diameter corresponds to the diameter of the outer periphery of the stationary cylinder, a rotary head, and means for determining the position of the rotary head under such a condition that the rotary head projects outwardly of the rotary cylinder, the position-determining means being arranged between the rotary head and the outer periphery of the stationary cylinder to form a surface in conformance with the outer periphery of the rotary head.

Other objects and features of the invention will become apparent from the following detailed description of embodiments thereof.

DETAILED DESCRIPTION OF THE PREFERRED EMBODIMENTS

Figure 7:
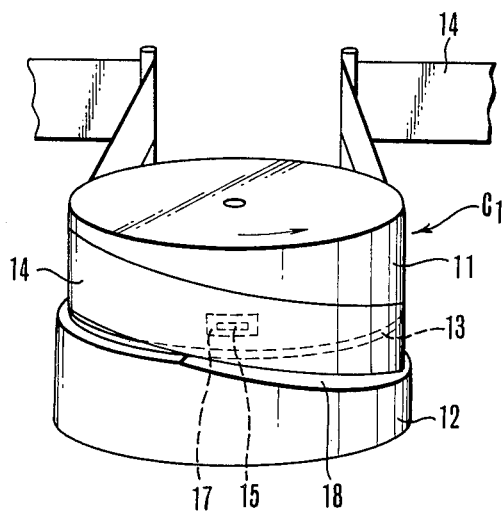
FIG. 7 is a perspective view of an embodiment of the rotary head device according to the present invention.
Figure 8:
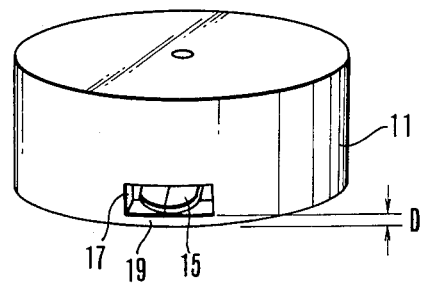
FIG. 8 is a perspective view of part of the device of FIG. 7 with the essential members in exaggerated scale.

FIGS. 7 and 8 illustrate an embodiment of this invention.

As shown in the figures, a cylinder $C_1$ is constructed by arranging an upper drum 11 and a lower drum 12 having a tape guide 18 through a slit 13. A magnetic tape 14 is obliquely trained round this cylinder $C_1$. Such an arrangement is similar to that of the conventional example. But, in this embodiment, a hole 17 of the upper drum 11 in which a magnetic head 15 is to be arranged is formed in a spaced relation from the slit 13-side parallel plane by a certain distance D, and is of such a shape that it opens up in the peripheral surface of the upper drum 11. It is in this point that the present invention differs from the prior art. That is, the hole 17 is formed in the upper drum 11, leaving a solid peripheral surface portion 19 of a width identified as the distance D from the edge of the flat plane of the upper drum 11. The distance D herein defined is preferably larger from the stand point of the floating characteristic of the magnetic tape 14. But, if it is made too much large, the tape guide 18 of the lower drum 12 becomes shorter. Therefore, variation of the position of the magnetic tape 14 by the head sliding is liable to occur, increasing the amount of jitter. Conversely, for the distance D is decreased, there is a limitation from the tolerances for manufacturing. According to the investigation of the present inventors, it has been found that, for the distance D, to set forth a range of 0.2 to 2 mm is suitable on the mechanical structure. It should be noted here that since the positioning of the hole 17 to satisfy such a condition leads to place the hole 17 farther away from the slit 13, it is in this embodiment that the slit 13 is shifted downward by changing the ratio of the lengths of the upper and lower drums 11 and 12 so that the relative position of the hole 17 to the total length of the cylinder $C_1$ remains constant. In other words, because the relative spatial relationship of the magnetic head 15 and the magnetic tape 14 should not be altered, the length of the upper drum 11 is made longer by an amount necessary to provide the above-described solid peripheral surface portion 19 between the hole 17 and the slit 13, and the length of the lower drum 12 is made shorter by that amount. And, since the tape guide 18 has its position determined in correspondence to the magnetic tape 14, its length is made shorter by an amount equal to that by which the lower drum 12 becomes shorter.

Next, the advantages are described.

At first, because the upper drum 11 is provided with the above-described peripheral surface portion 19 in between the hole 17 and the slit 13, the lifting-up force is exerted even in this portion 19, thus improving the floating characteristic of the magnetic tape 14 at or near the magnetic head 15. This is equivalent to the placing of the magnetic head 15 farther away from the slit 13. In this position, the floating amount of the magnetic tape 14 is stable, and the force of pushing the magnetic tape 14 to the magnetic head 15 is also reduced. For this reason, it is possible to form a uniform spacing between the magnetic head 15 and the magnetic tape 14 with ease.

This leads to decrease the worn amount of the magnetic head 15, and lower the damage of the magnetic tape 14 too. Also, the frictional resistance between the magnetic head 15 and the magnetic tape 14 and between the upper drum 11 and the magnetic tape 14 is prevented from increasing. Therefore, the possibility of giving streaks to the magnetic tape 14 is lessened. As a result, an improvement of the durability and fidelity can be achieved.

Further, according to this embodiment, the width of that part of the magnetic tape 14 which is trained round the upper drum 11 is wider than in the prior art. Hence, the range of variation of the floating amount of the tape with the variation of the angular position of the upper drum 11 is reduced. As a result, the envelope of the output becomes more uniform and excellent. Also, as another reason for improving the envelope, mention may be made that because the floating state of the magnetic tape 14 near the magnetic head 15 is stabilized, the contact position of the magnetic tape 14 with the magnetic head 15 does not change to the track direction. By the way, according to the result of the various measurements in connection with this embodiment, the worn amount of the magnetic head 15 is reduced to less than ½ of the conventional example, while the output level is maintained unchanged from that of the conventional example. Also, there are produced no streaks due to the friction of the magnetic tape 14 with the magnetic head 15. Even the streaks due to the friction with the upper drum 11 which often became the problem in the conventional example are not produced at all. Also, an appreciable improvement of the output envelope is found.

Figure 1:
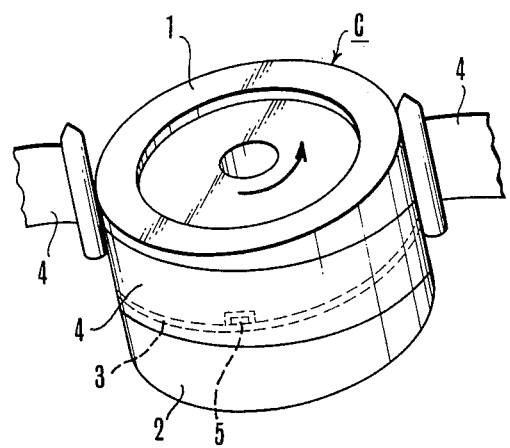
FIG. 1 is a perspective view of the conventional rotary head device.
Figure 2:
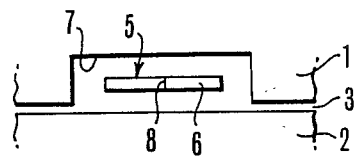
FIG. 2 is a sectional view in exaggerated scale of the essential part of FIG. 1.
Figure 9:
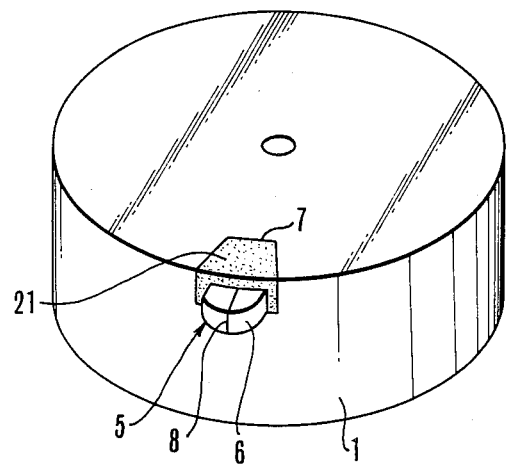
FIG. 9 is a perspective view of another embodiment of the rotary head device according to the present invention.
Figure 10:
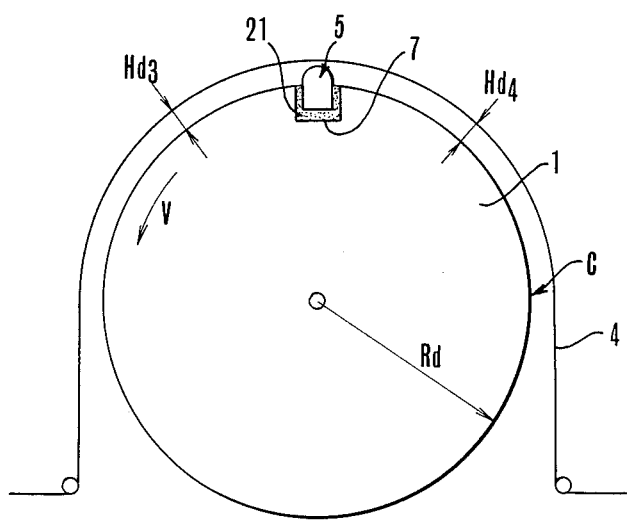
FIG. 10 is a schematic sectional view, partly in exaggerated scale, of the essential parts of FIG. 9.

FIGS. 9 and 10 illustrate another embodiment of this invention. The same or corresponding parts as or to those shown in FIGS. 1 and 3 are denoted by the same reference characters.

Figure 3:
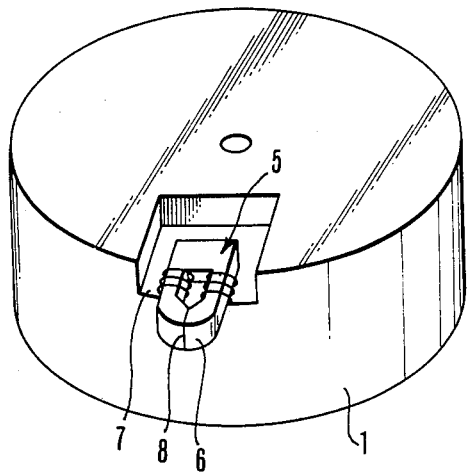
FIG. 3 is a perspective view of part of the device of FIG. 1 with the essential members in exaggerated scale.
Figure 4:
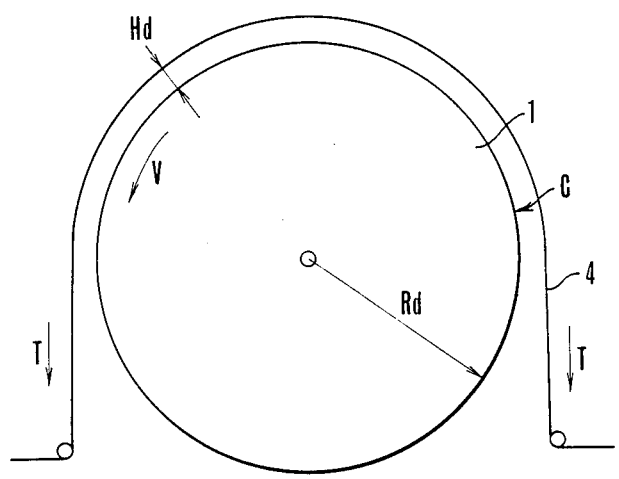
FIGS. 4 and 5 are schematic sectional views taken to explain the features of the device of FIG. 1.

FIG. 9 shows an upper drum 1 having a magnetic head 5 mounted thereon with its upper side down, corresponding to FIG. 3 for the conventional example. In FIG. 9, an arrangement that the magnetic head 5 is placed in a recessed portion 7 of the upper drum 1 and its sliding surface 6 and magnetic gap 8 projects outwardly of the cylindrical surface of the upper drum 1 is the same as in the conventional example. But, their difference lies in that while, in the conventional example, the magnetic head 5 is merely set in the recessed portion 7 of the upper drum 1, it is in this embodiment that the space appearing between the recessed portion 7 and the magnetic head 5 is filled with synthetic resin 21 such as silicon resin, in other words, the magnetic head 5 is buried in the upper drum 1. As a result, though, in the conventional example, there was an air space between the magnetic head 5 and the recessed portion 7, this embodiment has no such air space portion.

As for the shape of the exposed surface of the synthetic resin 21 in between the walls of the recessed portion 7 and the magnetic head 5, it is not always necessary to be in exactly the same conformance with the surface of the drum. A slight stepped portion may exist. In principle, the acceptable maximum depth of the stepped-down portion is not to induce almost any appreciable whirl of the air flow therefrom. This depth is determined as being sufficiently small in comparison with the angular distance of the exposed surface of the synthetic resin gasket. Concretely speaking, their ratio may be 1/10 or less. Also, some gap may exist between the synthetic resin 21 and the walls of the recessed portion 7 or the magnetic head 5, provided the air flow is not disturbed thereby.

Next, the function is described by reference to FIG. 10.

Figure 5:
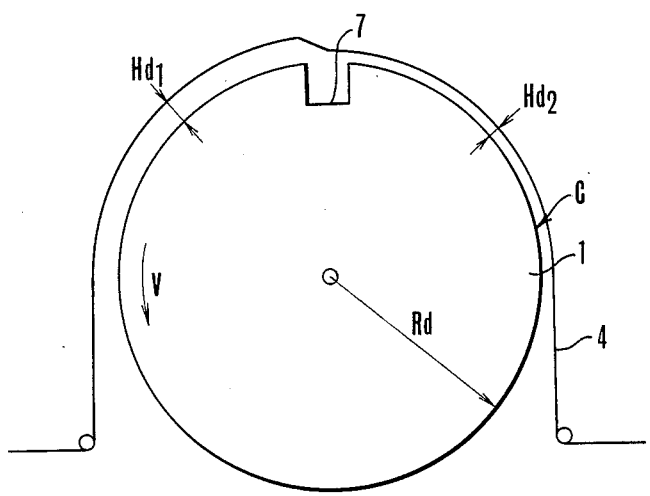
Figure 6:
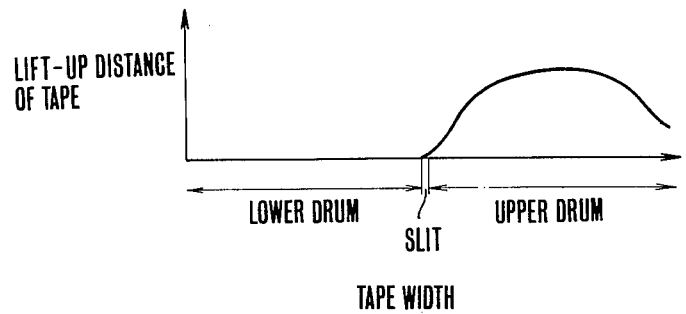
FIG. 6 is a graph illustrating the floating amount of the magnetic tape with respect to the width thereof in the conventional rotary head device.

The same figure corresponds to FIG. 5 for the conventional example. Now, the upper drum 1 of radius Rd rotates at a peripheral speed V. Letting the floating amount of the magnetic tape 4 in the front side of the magnetic head 5 as viewed in the advancing direction of the latter be denoted by $Hd_3$, the floating amount in the rear side by $Hd_4$, because there exists no air space between the recessed portion 7 and the magnetic head 5, the floating amounts $Hd_3$ and $Hd_4$ are equalized to each other, taking the value represented by the above-described equation (1). Also, even near the magnetic head 5, the floating amount of the magnetic tape 4 is fundamentally constant, being susceptible only to the influence of the magnetic head 5.

As a result, first, since the floating amount of the magnetic tape 4 never largely decreases at the neighborhood of the magnetic head 5, because the magnitude of the force by which the magnetic head 5 and the magnetic tape 4 are pressed against each other is reduced as compared with the conventional example. Thus, the worn amount of the magnetic head 5 is lessened. Also, from the same reason, the damage, too, of the magnetic tape 4 due to the running of the magnetic head 5 is reduced, and the production of streaks on the magnetic tape 4 by the magnetic head 5 is also prevented. Also, since the floating amount of the magnetic tape 4 does not particularly decrease at or near the magnetic head 5, and, moreover, the recessed portion 7 is not opened up to the peripheral surface of the upper drum 1, the possibility that the magnetic tape 4 is looped to contact with the edge of the recessed portion 7 and is scratched as was in the prior art is reduced to zero. Also, by these situations, the running resistance of the magnetic tape 4 is reduced, giving another advantage of improving the jittering.

Further, whilst in the conventional example of construction, as the magnetic tape 4 is thinner, the floating amount rapidly decreases, it is according to the construction of the embodiment of the invention that the problem of the prior art can substantially be solved. Hence, the thinning of the magnetic tape 4 gives rise to no problem.

For note, the experiments by measuring the worn amount of the magnetic head 5 and its output characteristics in the above-described embodiment show that the worn amount is improved to less than ½ as compared with the conventional example, and such an improvement is achieved without producing any adverse effect on the output.

Figure 11:
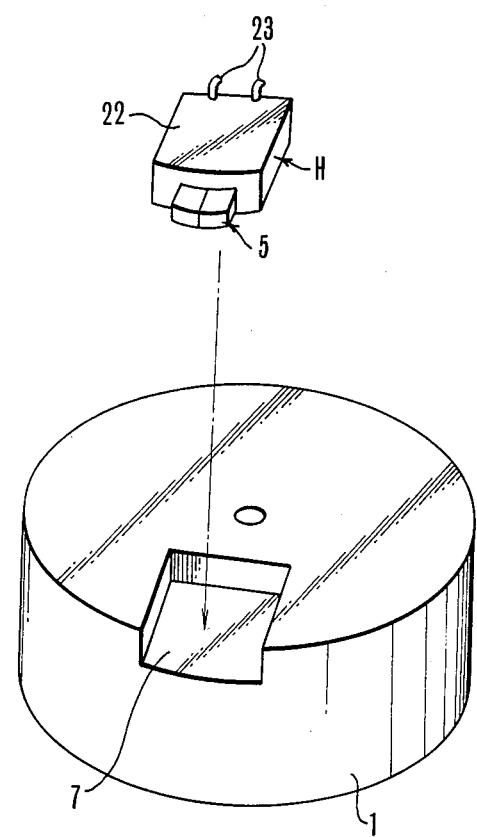
FIG. 11 is a production view of still another embodiment of the rotary head device according to the present invention.

FIG. 11 illustrates still another embodiment of the invention.

This is to form a package head H by previously burying the magnetic head 5 in a body of synthetic resin 22 such as silicon resin along with leads 23 of wire. After that, the package head H is put into a fitted recess 7 provided in the upper drum 1. In such a manner, the magnetic head 5 is fixedly secured to the upper drum 1. This embodiment has an advantage of improving the efficiency of manufacturing over that shown in FIG. 9, because it is easier to fill the vacant space surrounding the magnetic head 5 with resin.

What is claimed is:

1. A rotary head device comprising:
   (a) a stationary cylinder having a stationary outer peripheral surface on which a step portion to guide a tape-shaped medium is formed;
   (b) a rotary cylinder rotatably supported relative to said stationary cylinder, said rotary cylinder having a rotary outer peripheral surface which has a diameter corresponding to a diameter of said stationary outer peripheral surface; and
   (c) a rotary head arranged to project outwardly of said rotary outer peripheral surface of said rotary cylinder, said rotary outer peripheral surface including a continuous surface which is continuous with another surface of said rotary outer peripheral surface and is arranged between said stationary outer peripheral surface and said rotary head projecting outwardly of said rotary outer peripheral surface,
   said rotary cylinder including a hole portion formed at a position spaced from an edge of said rotary outer peripheral surface which confronts said stationary cylinder by not less than 0.2 mm but not more than 2 mm.

2. A device according to claim 1, wherein the shape of an opening of said hole portion is rectangular.

3. A device according to claim 1, wherein said rotary head is arranged at a position spaced form an edge of an opening of said hole portion.

4. A rotary head device comprising:
   (a) a stationary cylinder having a stationary outer peripheral surface on which a step portion to guide a tape-shaped medium is formed;
   (b) a rotary cylinder rotatably supported relative to said stationary cylinder, said rotary cylinder having a rotary outer peripheral surface which has a diameter corresponding to a diameter of said stationary outer peripheral surface; and
   (c) a rotary head arranged to project outwardly of said rotary outer peripheral surface of said rotary cylinder, said rotary outer peripheral surface including a continuous surface which is continuous with another surface of said rotary outer peripheral surface and is arranged between said stationary outer peripheral surface and said rotary head projecting outwardly of said rotary peripheral surface,
   said continuous surface being formed by molding resins.

5. A device according to claim 4, wherein said rotary cylinder includes a cutout portion formed along an edge of said rotary outer peripheral surface which confronts said stationary cylinder and a vacant space within said cutout portion positioned between said rotary head and said stationary cylinder.

6. A device according to claim 5, wherein the vacant space within said cutout portion positioned between said rotary head and said rotary cylinder is filled with resins.

7. A device according to claim 4, wherein there is no space between said continuous surface and said rotary head projecting outwardly of said rotary outer peripheral surface.

8. A rotary head device comprising:
   (a) a stationary cylinder having a stationary outer peripheral surface on which a step portion to guide a tape-shaped medium is formed;
   (b) a rotary cylinder rotatably supported relative to said stationary cylinder, said rotary cylinder having a rotary outer peripheral surface which has a diameter corresponding to a diameter of said stationary outer peripheral surface; and
   (c) a rotary head arranged to project outwardly of said rotary peripheral surface of said rotary cylinder,
   said rotary outer peripheral surface including a continuous surface which is continuous with another surface of said rotary outer peripheral surface and is arranged between said stationary outer peripheral surface and said rotary head projecting outwardly of said rotary outer peripheral surface,
   there being no space between continuous surface and said rotary head projecting outwardly of said rotary outer peripheral surface.

* * * * *